US009648401B2

(12) United States Patent
Yan

(10) Patent No.: US 9,648,401 B2
(45) Date of Patent: May 9, 2017

(54) DATA CENTER NETWORK AND METHOD FOR DEPLOYING THE DATA CENTER NETWORK

(71) Applicant: Huawei Technologies Co., Ltd., Shenzhen (CN)

(72) Inventor: Qinghua Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 14/694,776

(22) Filed: Apr. 23, 2015

(65) Prior Publication Data

US 2015/0312657 A1 Oct. 29, 2015

(30) Foreign Application Priority Data

Apr. 24, 2014 (CN) .......................... 2014 1 0168078

(51) Int. Cl.
*H04Q 11/00* (2006.01)
*H04J 14/02* (2006.01)

(52) U.S. Cl.
CPC ...... *H04Q 11/0005* (2013.01); *H04J 14/0261* (2013.01); *H04J 14/0282* (2013.01); *H04Q 11/0062* (2013.01); *H04Q 2011/0016* (2013.01); *H04Q 2011/0032* (2013.01); *H04Q 2011/0075* (2013.01); *H04Q 2011/0096* (2013.01)

(58) Field of Classification Search
CPC ........... H04Q 11/0005; H04Q 11/0062; H04Q 2011/0075; H04Q 2011/0096; H04Q 2011/0032; H04Q 2011/0016; H04J 14/0261; H04J 14/0282
See application file for complete search history.

(56) References Cited

U.S. PATENT DOCUMENTS

2003/0193937 A1* 10/2003 Beshai ............... H04Q 11/0005
370/372
2013/0287397 A1 10/2013 Frankel et al.
2015/0125112 A1* 5/2015 Frankel ................ H04B 10/271
385/16

FOREIGN PATENT DOCUMENTS

CN 102318363 A 1/2012
CN 102907054 A 1/2013

OTHER PUBLICATIONS

Xu, Q., et al., "Analysis of Large-Scale Multi-Stage All-Optical Packet Switching Routers," J. Opt. Commun. Network, vol. 4, No. 5, May 2012, pp. 412-425.

(Continued)

*Primary Examiner* — Leslie Pascal
(74) *Attorney, Agent, or Firm* — Conley Rose, P.C.

(57) ABSTRACT

A data center network and a method for deploying the data center network. The data center network includes one core switch group, m cyclic arrayed waveguide grating (CAWG) groups, and m edge switch groups, where the core switch group includes k core switches; each CAWG group includes 2*Y N*N CAWGs, where the 2*Y CAWGs include Y uplink CAWGs and Y downlink CAWGs, the Y uplink CAWGs are connected to each core switch in the core switch group separately using an optical uplink, and the Y downlink CAWGs are connected to each core switch in the core switch group separately using an optical downlink; and each edge switch of an edge switch group is connected to an uplink CAWG and a downlink CAWG in a corresponding CAWG group separately. The present invention can reduce the number of optical fibers in a data center network.

12 Claims, 8 Drawing Sheets

(56) References Cited

OTHER PUBLICATIONS

Ye, X., et al., "AWGR-Based Optical TOpologies for Scalable and Efficient Global Communications in Large-Scale Multi-Processor Systems," J. Opt. Commun. Network, vol. 4, No. 9, Sep. 2012, pp. 651-662.
Csernai, M., et al., "Reducing Cabling Complexity in Large Flattened Butterfly Networks by an Order of Magnitude," Optical Society of America, Mar. 9, 2014, 3 pages.
Foreign Communication From A Counterpart Application, European Application No. 15163135.5, Extended European Search Report dated Sep. 17, 2015, 7 pages.
Partial English Translation and Abstract of Chinese Patent Application No. CN102907054, Jan. 30, 2013, 20 pages.
Foreign Communication From A Counterpart Application, Chinese Application No. 2014101680784, Chinese Search Report dated Feb. 23, 2017, 2 pages.
Foreign Communication From A Counterpart Application, Chinese Application No. 2014101680784, Chinese Office Action dated Mar. 13, 2017, 5 pages.

* cited by examiner

DATA CENTER NETWORK AND METHOD FOR DEPLOYING THE DATA CENTER NETWORK

CROSS-REFERENCE TO RELATED APPLICATION

This application claims priority to Chinese Patent Application No. 201410168078.4, filed on Apr. 24, 2014, which is hereby incorporated by reference in its entirety.

TECHNICAL FIELD

The present invention relates to network communications technologies, and in particular, to a data center network and a method for deploying the date center network.

BACKGROUND

Global communications networks witness a tendency towards network construction centered on a data center. There is a big change in a network traffic model in the era of cloud computing, with 16 percent (%) of traffic on operator networks, 14% of the traffic on enterprise networks, and the remaining 70% of the traffic all flowing to insides of data centers. An exponential growth in data center traffic and bandwidth has been far beyond people's expectations on a traditional network. Large bandwidth and a high extensibility capability have become the chief demands of data center customers. A bottleneck of data center network construction is also increasingly obvious.

FIG. 1 is a schematic diagram of a network structure of an existing large-scale data center. In this data center, all servers can be connected for interworking only using switches at an access layer, a convergence layer and a core layer, and the expansion of the network scale is limited by capacities of core switches, making it difficult to meet the needs of future service development.

In addition, in a physical network of the existing data center, an access switch and a convergence switch are directly connected using an optical fiber, and each pair of ports occupy one pair of optical fibers. If the network scale is relatively large, thousands of pairs of connecting fibers are required, which not only brings a severe challenge to physical space of an equipment room, but also brings a great difficulty in operation and maintenance, such as troubleshooting. In addition, numerous ports in the data center cause an increase of required optical modules, which are connected using multimode and multi-core optical fibers. Customization costs and connector costs of the multi-core optical fibers are very high, and cabling costs are even 3 to 4 times the costs of the optical modules.

Therefore, it is necessary to provide a new data center network, which can be beyond a limitation of core switch capacities, reduce the number of optical fibers in the data center network, save equipment room space, simplify maintenance operations on the data center network, and reduce costs of data center network construction.

SUMMARY

The present invention provides a data center network and a method for deploying the data center network, which can reduce the number of optical fibers in the data center network, simplify maintenance operations on the data center network, and reduce costs of data center network construction.

A first aspect of the present invention provides a data center network, including one core switch group, m cyclic arrayed waveguide grating (CAWG) groups, and m edge switch groups, where the m CAWG groups and the m edge switch groups are in a one-to-one correspondence, the m CAWG groups include a first CAWG group, and the m edge switch groups include a first edge switch group, where the first edge switch group is any one of the m edge switch groups, and the first CAWG group is a CAWG group corresponding to the first edge switch group; the core switch group includes k core switches; the first CAWG group includes 2*Y N*N CAWGs, where the 2*Y CAWGs include Y uplink CAWGs and Y downlink CAWGs, the Y uplink CAWGs are connected to each core switch in the core switch group separately using an optical uplink, and the Y downlink CAWGs are connected to each core switch in the core switch group separately using an optical downlink; and the first edge switch group includes multiple edge switches; each edge switch of the multiple edge switches is connected to an uplink CAWG and a downlink CAWG in the first CAWG group separately; and any one of the number of edge switches in the first edge switch group, the number of ports of each edge switch in the first edge switch group, and k is less than or equal to N.

With reference to the first aspect, in a first implementation manner of the first aspect, the first edge switch group further includes multiple edge optical multiplexer/demultiplexer groups separately corresponding to the multiple edge switches in the first edge switch group, and each edge optical multiplexer/demultiplexer group includes at least one edge optical multiplexer/demultiplexer; and that each edge switch of the multiple edge switches is connected to an uplink CAWG and a downlink CAWG in the first CAWG group separately includes each edge switch is connected to the uplink CAWG in the first CAWG group using a corresponding edge optical multiplexer/demultiplexer group and an optical uplink connected to the edge optical multiplexer/demultiplexer group, and each edge switch is connected to the downlink CAWG in the first CAWG group using the edge optical multiplexer/demultiplexer group and an optical downlink connected to the edge optical multiplexer/demultiplexer group.

With reference to the first implementation manner of the first aspect, in a second implementation manner of the first aspect, the data center network further includes m core optical multiplexer/demultiplexer groups, where the m core optical multiplexer/demultiplexer groups and the m CAWG groups are in a one-to-one correspondence, and the m core optical multiplexer/demultiplexer groups include a first core optical multiplexer/demultiplexer group, where the first core optical multiplexer/demultiplexer group is any one of the m core optical multiplexer/demultiplexer groups, and the first core optical multiplexer/demultiplexer group corresponds to the first CAWG group; the first core optical multiplexer/demultiplexer group includes 2*Y*N core optical multiplexers/demultiplexers, and N core optical multiplexers/demultiplexers correspond to one uplink CAWG or one downlink CAWG; that the Y uplink CAWGs are connected to each core switch in the core switch group separately using an optical uplink includes each uplink CAWG of the Y uplink CAWGs is connected to each core switch in the core switch group using N core optical multiplexers/demultiplexers that are connected to each uplink CAWG using optical uplinks; and that the Y downlink CAWGs are connected to each core switch in the core switch group separately using an optical downlink includes each downlink CAWG is connected to each core switch in the core switch group using N core optical multiplexers/demultiplexers that are connected to each downlink CAWG using optical downlinks.

With reference to the first or the second implementation manner of the first aspect, in a third implementation manner of the first aspect, a port of each edge switch in the first edge switch group is a 10 Gigabit Ethernet (GE) port, the edge optical multiplexer/demultiplexer group corresponding to each edge switch includes one edge optical multiplexer/demultiplexer, Y=1, the first CAWG group includes one uplink CAWG and one downlink CAWG, the edge optical multiplexer/demultiplexer corresponding to each edge switch in the first edge switch group is connected to different ports of the uplink CAWG separately using optical uplinks, and the edge optical multiplexer/demultiplexer corresponding to each edge switch in the first edge switch group is connected to different ports of the downlink CAWG separately using optical downlinks.

With reference to the first or the second implementation manner of the first aspect, in a fourth implementation manner of the first aspect, a port of each edge switch in the first edge switch group is an H*10 G port, each port is divided into H lanes, and signals sent through the lanes have a same wavelength; the edge optical multiplexer/demultiplexer group corresponding to each edge switch includes H edge optical multiplexers/demultiplexers; the H edge optical multiplexers/demultiplexers are separately connected to lanes of same ordinal numbers of each port; the first CAWG group includes Y uplink CAWGs and Y downlink CAWGs, where Y=H; and the H edge optical multiplexers/demultiplexers corresponding to each edge switch are connected to the Y uplink CAWGs separately using optical uplinks, and the H edge optical multiplexers/demultiplexers corresponding to each edge switch are connected to the Y downlink CAWGs separately using optical downlinks.

With reference to the first or the second implementation manner of the first aspect, in a fifth implementation manner of the first aspect, a port of each edge switch in the first edge switch group is an H*10 G port, each port is divided into H lanes, and signals sent through the lanes correspond to different wavelengths; the edge optical multiplexer/demultiplexer group corresponding to each edge switch includes H edge optical multiplexers/demultiplexers; the H edge optical multiplexers/demultiplexers are separately connected to lanes of same ordinal numbers of each port of the corresponding edge switch; the first CAWG group includes one uplink CAWG and one downlink CAWG; and the H edge optical multiplexers/demultiplexers corresponding to each edge switch are connected to H ports of the uplink CAWG separately using optical uplinks, and the H ports corresponding to each edge switch are connected to H ports of the downlink CAWG separately using optical downlinks.

With reference to the first or the second implementation manner of the first aspect, in a sixth implementation manner of the first aspect, a port of each edge switch in the first edge switch group is an H*10 G port, each port is divided into H lanes, and signals sent through the lanes correspond to different wavelengths; the edge optical multiplexer/demultiplexer group corresponding to each edge switch includes two edge optical multiplexers/demultiplexers, where one edge optical multiplexer/demultiplexer is connected to lanes of each port of the corresponding edge switch, and the other edge optical multiplexer/demultiplexer is connected to the rest H-L lanes of each port of the corresponding edge switch; the first CAWG group includes one uplink CAWG and one downlink CAWG; and the two edge optical multiplexers/demultiplexers corresponding to each edge switch are connected to two ports of the uplink CAWG separately using optical uplinks, and the two edge optical multiplexers/demultiplexers corresponding to each edge switch are connected to two ports of the downlink CAWG separately using optical downlinks.

With reference to the first or the second implementation manner of the first aspect, in a seventh implementation manner of the first aspect, a port of each edge switch in the first edge switch group is an H*10 G port, each port is divided into H lanes, and signals sent through the lanes correspond to different wavelengths; the edge optical multiplexer/demultiplexer group corresponding to each edge switch includes one edge optical multiplexer/demultiplexer, and the edge optical multiplexer/demultiplexer is connected to all the H lanes of each port of the corresponding edge switch; the first CAWG group includes one uplink CAWG and one downlink CAWG; and the edge optical multiplexer/demultiplexer corresponding to each edge switch is connected to one port of the uplink CAWG using an optical uplink, and the edge optical multiplexer/demultiplexer corresponding to each edge switch is connected to one port of the downlink CAWG using an optical downlink.

With reference to the first aspect and any one of the first to the seventh implementation manners of the first aspect, in an eighth implementation manner of the first aspect, if the multiple edge switches in the first edge switch group cannot process a wavelength division multiplexing (WDM) signal, the first edge switch group further includes multiple optical-to-electrical conversion apparatuses corresponding to the multiple edge switches, where each optical-to-electrical conversion apparatus is configured to convert an electrical signal or an optical signal that is sent by an edge switch connected to the optical-to-electrical conversion apparatus into a WDM signal, and send the WDM signal to a corresponding edge optical multiplexer/demultiplexer.

A second aspect of the present invention provides a method for deploying a data center network, where the data center network is the data center network according to the first aspect and any one of the first to the eighth implementation manners of the first aspect, and the method includes providing one core switch group, m CAWG groups, and m edge switch groups, where the m CAWG groups and the m edge switch groups are in a one-to-one correspondence, the m CAWG groups include a first CAWG group, and the m edge switch groups include a first edge switch group, and the first edge switch group comprises multiple edge switches; where the first edge switch group is any one of the m edge switch groups, and the first CAWG group is a CAWG group corresponding to the first edge switch group; and the first CAWG group includes 2*Y N*N CAWGs, and the 2*Y CAWGs include Y uplink CAWGs and Y downlink CAWGs; connecting the Y uplink CAWGs to each core switch in the core switch group separately using an optical uplink; connecting the Y downlink CAWGs to each core switch in the core switch group separately using an optical downlink; and connecting each edge switch of the multiple edge switches to an uplink CAWG and a downlink CAWG in the first CAWG group separately.

According to the present invention, CAWG groups are used to deploy a data center network, which can substantially reduce the number of optical fibers required for networking and further reduce cabling costs. In addition, because the number of optical fibers required is substantially reduced, a bottleneck of cabling in an equipment room is solved, and physical deployment of devices is simplified. Furthermore, because a CAWG is used as an intermediate device for connecting an edge switch and a core switch, port capacity expansion on a switch can be implemented simply by connecting a pigtail to an edge optical multiplexer/demultiplexer, without a need to deploy pipeline fibers across equipment rooms, which makes network capacity expansion and maintenance convenient.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 2:
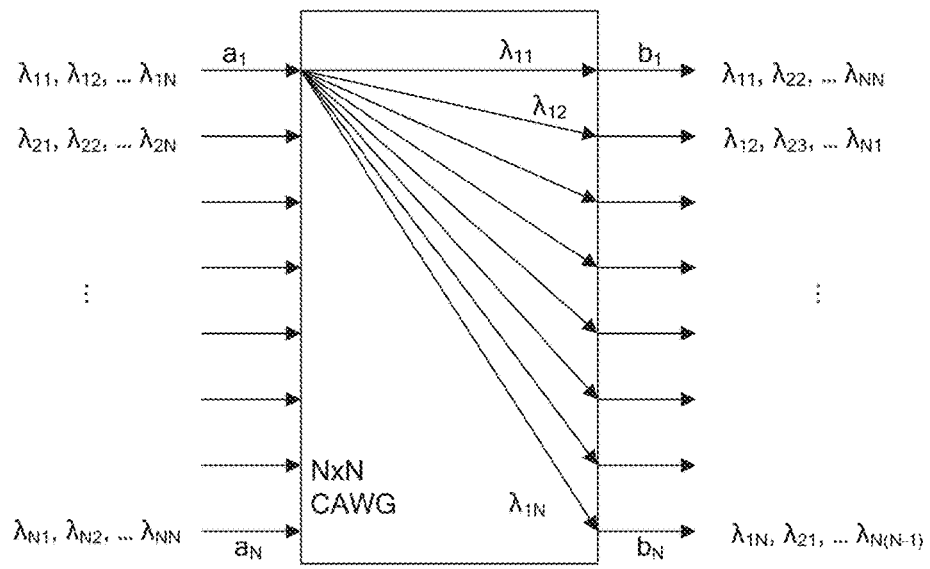
FIG. 2 is a schematic diagram of an operating principle of a cyclic arrayed waveguide gating.

FIG. 2 is a schematic diagram of an operating principle of a cyclic arrayed waveguide gating. A CAWG, also called an AWG router or a cyclic interleaver, is a wavelength-based N*N cyclic optical multiplexer/demultiplexer and can send wavelengths from different ingress ports to different egress ports in a cyclic manner. As shown in FIG. 2, the CAWG has N input optical fibers and N output optical fibers. Each input optical fiber can transmit N wavelengths; therefore, in the case of full load, N*N wavelengths can be input on an input side, and after internal switching, the CAWG distributes wavelengths on each input optical fiber to N different output optical fibers. Each wavelength can be represented by $\lambda_{ij}$, where $\lambda$ represents a wavelength, i represents a number of an input port, j represents a number of the wavelength in the port group, i and j are both positive integers less than or equal to N, and N is the maximum number of wavelengths that can be supported by each port of the CAWG. As shown in FIG. 2, N wavelengths that are input on input port $a_1$ are $\lambda_{11}, \lambda_{12}, \ldots, \lambda_{1N}$ separately, and on an output side, the N wavelengths are distributed to output optical fibers $b_1$ to $b_N$ separately. The CAWG can implement N*N strictly non-blocking switching.

The foregoing characteristics of the CAWG are applied in the embodiments of the present invention to implement a new data center network.

Figure 3:
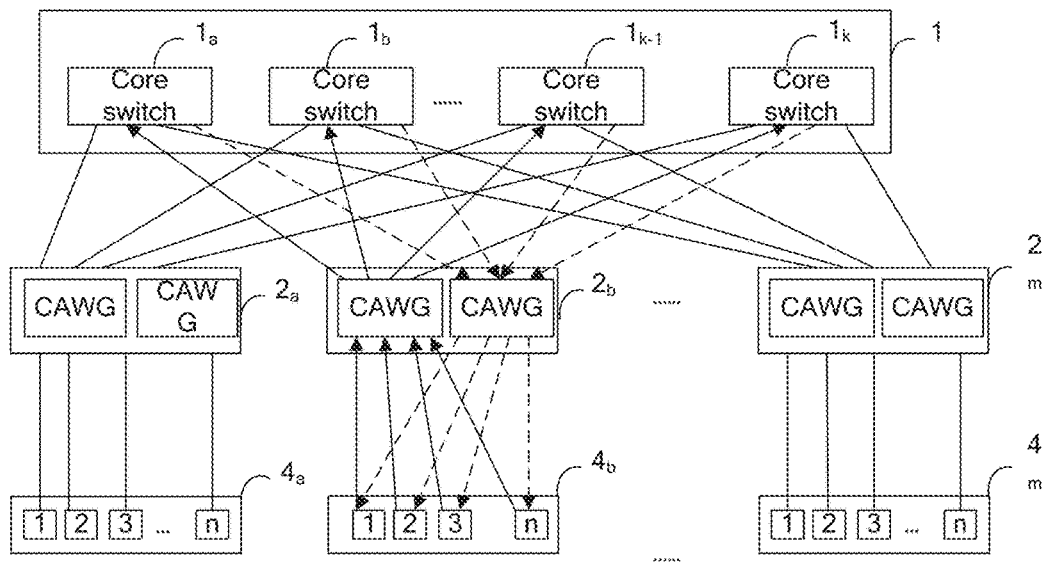
FIG. 3 is a schematic structural diagram of a data center network according to an embodiment of the present invention.

FIG. 3 is a schematic structural diagram of a data center network according to an embodiment of the present invention. The data center network includes one core switch group 1, m CAWG groups $2_a$ to $2_m$, and m edge switch groups $4_a$ to $4_m$, where the m CAWG groups and the m edge switch groups are in a one-to-one correspondence, the m CAWG groups include a first CAWG group, and the m edge switch groups include a first edge switch group, where the first edge switch group is any one of the m edge switch groups, and the first CAWG group is a CAWG group corresponding to the first edge switch group. In the data center network of the present invention, interworking of all edge switches in the m edge switch groups is implemented using the m CAWG groups and the core switch group 1, where m is a positive integer greater than or equal to 1.

The core switch group includes k core switches. The first CAWG group includes 2*Y N*N CAWGs, where Y is a positive integer greater than or equal to 1, and preferably, Y is 2 raised to the $f^{th}$ power, where f is an integer greater or equal to 0. The 2*Y CAWGs include Y uplink CAWGs and Y downlink CAWGs; each uplink CAWG of the Y uplink CAWGs is connected to each core switch in the core switch group 1 using an optical uplink; each downlink CAWG of the Y downlink CAWGs is connected to each core switch in the core switch group 1 using an optical downlink. The uplink refers to a direction from an edge switch to a core switch, and the uplink CAWG refers to a CAWG on which an input port is connected to an edge switch and an output port is connected to a core switch. The downlink refers to a direction from a core switch to an edge switch, and the downlink CAWG refers to a CAWG on which an input port is connected to a core switch and an output port is connected to an edge switch.

The first edge switch group includes multiple edge switches, where each edge switch of the multiple edge switches is connected to an uplink CAWG and a downlink CAWG in the first CAWG group separately. Any one of the number of edge switches in the first edge switch group, the number of ports of each edge switch in the first edge switch group, and k is less than or equal to N. Numbers of edge switches included in all the edge switch groups of the m edge switch groups may be the same or different; correspondingly, specifications of CAWGs included in all the CAWG groups of the m CAWG groups may also be the same or different. Exemplarily, in FIG. 3, each CAWG group includes two CAWGs, and each edge switch group includes n edge switches.

The first edge switch group further includes multiple edge optical multiplexer/demultiplexer groups separately corresponding to the multiple edge switches in the first edge switch group, where each edge optical multiplexer/demultiplexer group includes at least one edge optical multiplexer/ demultiplexer. That each edge switch is connected to an uplink CAWG and a downlink CAWG in the first CAWG group separately, specifically means that each edge switch is connected to the uplink CAWG in the first CAWG group using a corresponding edge optical multiplexer/demultiplexer group and an optical uplink connected to the edge optical multiplexer/demultiplexer group, and is connected to the downlink CAWG in the first CAWG group using the edge optical multiplexer/demultiplexer group and an optical downlink connected to the edge optical multiplexer/demultiplexer group.

The data center network further includes m core optical multiplexer/demultiplexer groups, where the m core optical multiplexer/demultiplexer groups and the m CAWG groups are in a one-to-one correspondence, and the m core optical multiplexer/demultiplexer groups include a first core optical multiplexer/demultiplexer group, where the first core optical multiplexer/demultiplexer group is any one of the m core optical multiplexer/demultiplexer groups, and the first core optical multiplexer/demultiplexer group corresponds to the first CAWG group. The first core optical multiplexer/demultiplexer group includes 2*Y*N core optical multiplexers/demultiplexers corresponding to the 2*Y CAWGs, which means that N core optical multiplexers/demultiplexers correspond to one uplink CAWG or one downlink CAWG; each port of each CAWG corresponds to one core optical multiplexer/demultiplexer. That each uplink CAWG is connected to each core switch in the core switch group 1 using an optical uplink includes each uplink CAWG is connected to each core switch in the core switch group 1 using N core optical multiplexers/demultiplexers that are connected to each uplink CAWG using optical uplinks. That each downlink CAWG is connected to each core switch in the core switch group 1 using an optical downlink includes each downlink CAWG is connected to each core switch in the core switch group 1 using N core optical multiplexers/demultiplexers that are connected to each downlink CAWG using optical downlinks. In addition, each core optical multiplexer/demultiplexer is connected to each core switch in the core switch group 1.

Figure 4:
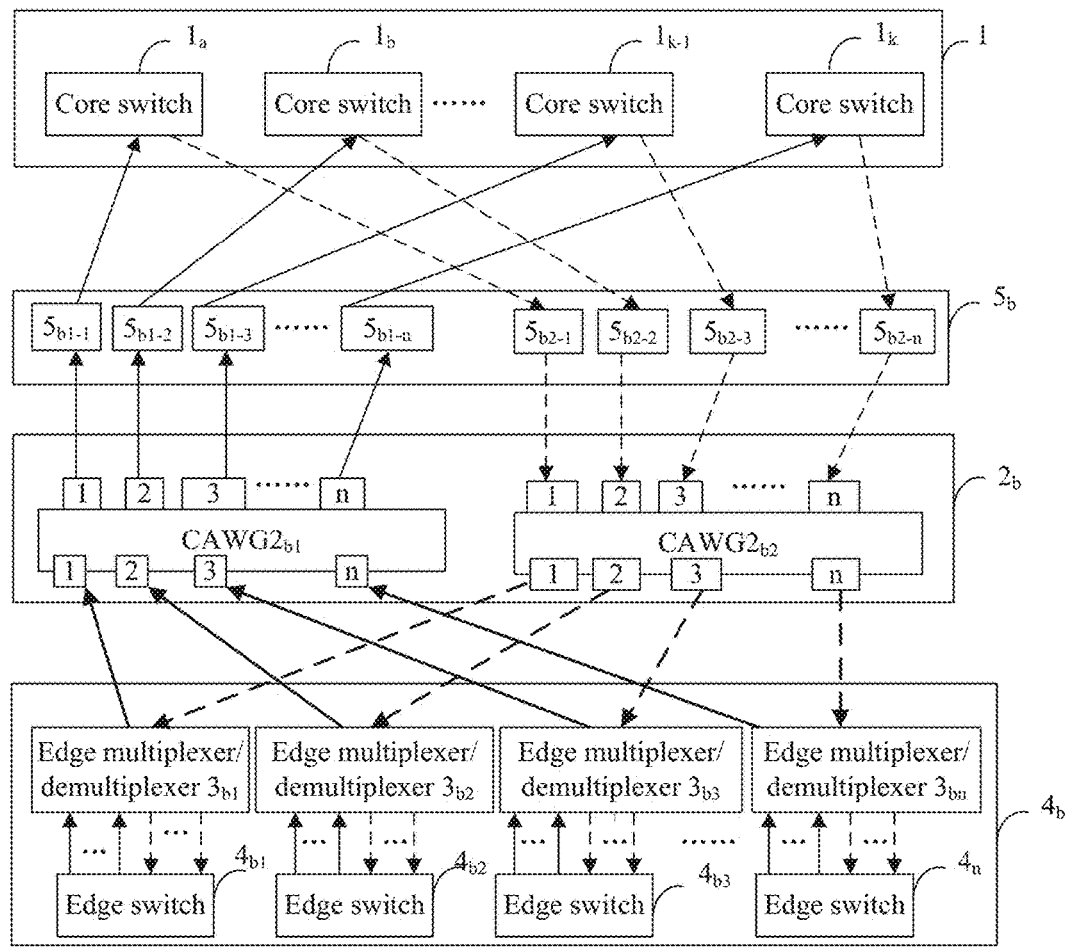
FIG. 4 is a schematic diagram of a connection between an edge switch group $4_b$ and a core switch group 1 according to an embodiment of the present invention.

In this embodiment of the present invention, multiple edge switches in one edge switch group have a same specification. One edge switch group may use a same networking manner as or a different networking manner from another edge switch group. A specification of an edge switch in one edge switch group may be the same as or different from a specification of an edge switch in another edge switch group. In the foregoing embodiment, the number k of core switches in the core switch group 1 is less than or equal to N, and the number n of edge switches in each edge switch group is less than or equal to N. Preferably, in order to take full advantage of device performance, in a data center network, the number k of core switches in the core switch group 1, the number n of edge switches in each edge switch group, and N are equal. When k is less than N, N core optical multiplexers/demultiplexers corresponding to one CAWG are connected to the k core switches in a polling manner, that is, one core switch can be connected to one or more core optical multiplexers/demultiplexers. In the following, one edge switch group is used as an example to describe in detail a structure of the data center network shown in FIG. 3. In the following embodiments, in an uplink direction, each edge optical multiplexer/demultiplexer is connected to a corresponding uplink CAWG using an optical uplink, and each uplink CAWG is connected to corresponding N core optical multiplexers/demultiplexers using optical uplinks; in a downlink direction, each core optical multiplexer/demultiplexer is connected to a corresponding downlink CAWG using an optical downlink, and each downlink CAWG is connected to corresponding edge optical multiplexers/demultiplexers using optical downlinks. Therefore, a description of an optical link is omitted in the following embodiments. The optical uplink and optical downlink are optical fibers. In addition, in the following embodiments, on a side facing a core switch, both an uplink CAWG and a downlink CAWG are connected to N core optical multiplexers/demultiplexers. In an embodiment of the present invention, it is assumed that a first edge switch group is an edge switch group $4_b$. FIG. 4 is a schematic diagram of a connection between the edge switch group $4_b$ and a core switch group 1. It is assumed that the edge switch group $4_b$ includes n edge switches, where the n edge switches are switches that support a 10 GE bidirectional port; each edge optical multiplexer/demultiplexer group of n edge optical multiplexer/demultiplexer groups $3_{b1}$ to $3_{bn}$ includes one edge optical multiplexer/demultiplexer; x ports of each edge switch in the edge switch group $4_b$ are all connected to a corresponding edge optical multiplexer/demultiplexer, for example, x ports of an edge switch $4_{b1}$ are connected to the edge optical multiplexer/demultiplexer $3_{b1}$, x ports of an edge switch $4_{b2}$ are connected to an edge optical multiplexer/demultiplexer $3_{b2}$, . . . , and x ports of an edge switch $4_{bn}$, are connected to the edge optical multiplexer/demultiplexer $3_{bn}$.

A CAWG group corresponding to the edge switch group $4_b$ is a CAWG$2_b$, and the CAWG$2_b$ includes two CAWGs, that is, 2*Y=2 and Y=1, where an uplink CAWG is a CAWG$2_{b1}$ and a downlink CAWG is a CAWG$2_{b2}$. Each edge switch in the edge switch group $4_b$ is connected to corresponding ports (which are represented by small boxes in the figure, where a port to which an arrow points is an input port, and a port that is far away from an arrow is an output port) of the uplink CAWG$2_{b1}$ and the downlink CAWG$2_{b2}$ separately using the corresponding edge optical multiplexers/demultiplexers $3_{b1}$ to $3_{bn}$. The CAWG group $2_b$ corresponds to a core optical multiplexer/demultiplexer group $5_b$, and the core optical multiplexer/demultiplexer group $5_b$ includes core optical multiplexers/demultiplexers $5_{b1-1}$ to $5_{b1-n}$ corresponding to the CAWG$2_{b1}$ and core optical multiplexers/demultiplexers $5_{b2-1}$ to $5_{b2-n}$ corresponding to the CAWG$2_{b2}$. Each output port of the uplink CAWG$2_{b1}$ and the downlink CAWG$2_{b2}$ is connected to one core optical multiplexer/demultiplexer in the core optical multiplexer/demultiplexer group $5_b$.

In the embodiment shown in FIG. 4, one edge optical multiplexer/demultiplexer is provided for each edge switch, two CAWGs are configured for each CAWG group, 2*N core optical multiplexers/demultiplexers are provided for a core optical multiplexer/demultiplexer group corresponding to the CAWG group, and an appropriate number of core switches are provided, thereby implementing interworking of all edge switches and substantially reducing the number of optical fibers required for data center construction.

Furthermore, at present, a switch supporting a high-speed Ethernet port (high-speed switch for short), for example, a switch supporting a 40 GE port or a 100 GE port emerges in the industry. A standard specifies that during data transmission, a 40 GE port is divided into four lanes, a 100 GE port is divided into 10 lanes, and a rate of each lane is 10 Gigabits per second (Gbps). In order to reduce costs of an optical module, generally, 4 pairs or 10 pairs of optical fibers are used to transmit 40 GE or 100 GE signals respectively.

Figure 5:
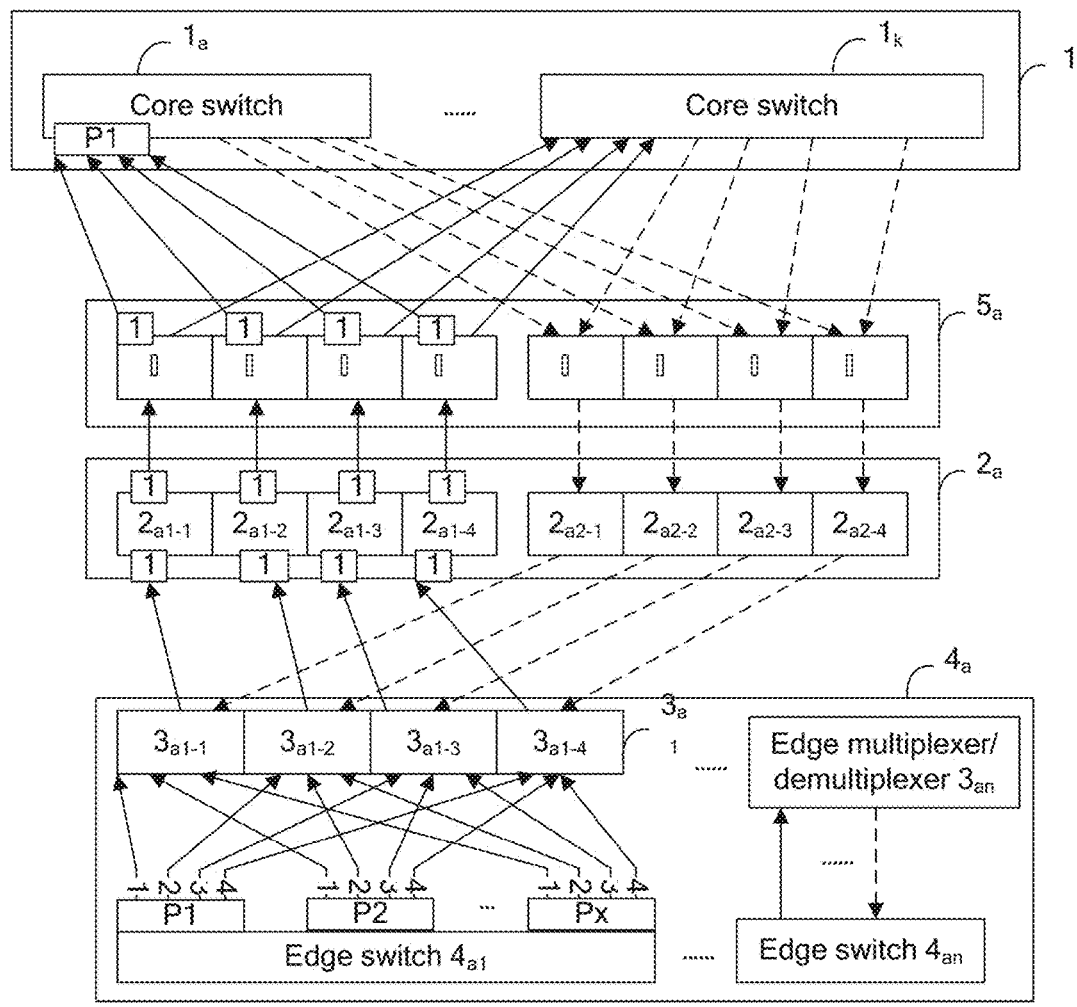
FIG. 5 is a schematic diagram of a connection between an edge switch group $4_a$ and a core switch group 1 when a port of an edge switch is a 40 GE port, according to another embodiment of the present invention.

In another embodiment of the present invention, it is assumed that the first edge switch group is an edge switch group $4_a$, and an edge switch in the edge switch group $4_a$ is a high-speed switch. If a port rate of the high-speed switch is H*10 Gbps, each port of the high-speed switch may be divided into H lanes, and signals sent through the H lanes of each port have a same wavelength. FIG. 5 is a schematic diagram of a connection between the edge switch group $4_a$ and a core switch group 1 according to this embodiment. For the purpose of clear description, a schematic diagram of uplink connections of an edge switch $4_{a1}$ is mainly illustrated. In this embodiment, each edge switch includes x H*10 GE ports P1 to Px, and each port includes H lanes (four lanes are illustrated in the figure and represented by a short vertical line); an edge optical multiplexer/demultiplexer group corresponding to each edge switch includes H edge optical multiplexers/demultiplexers (four edge optical multiplexers/demultiplexers are illustrated in the figure); lanes, having a same number, of the x ports of the edge switch correspond to a same edge optical multiplexer/demultiplexer, that is, the H edge optical multiplexers/demultiplexers are separately connected to lanes of same ordinal numbers of each port. For example, in FIG. 5, an edge optical multiplexer/demultiplexer $3_{a1-1}$ is connected to the first lane of each port of the edge switch $4_{a1}$; an edge optical multiplexer/demultiplexer $3_{a1-2}$ is connected to the second lane of each port of the edge switch $4_{a1}$; an edge optical multiplexer/demultiplexer $3_{a1-3}$ is connected to the third lane of each port of the edge switch $4_{a1}$; an edge optical multiplexer/demultiplexer $3_{a1-4}$ is connected to the fourth lane of each port of the edge switch $4_{a1}$. In this embodiment, Y=H=4, that is, a CAWG group $2_a$ corresponding to the edge switch group $4_a$ includes 2*Y=2*4=8 CAWGs. The edge optical multiplexers/demultiplexers $3_{a1-1}$, $3_{a1-2}$, $3_{a1-3}$, and $3_{a1-4}$ are connected to corresponding ports of uplink CAWGs $2_{a1-1}$, $2_{a1-2}$, $2_{a1-3}$, and $2_{a1-4}$ and downlink CAGWs $2_{a2-1}$, $2_{a2-2}$, $2_{a2-3}$, and $2_{a2-4}$ respectively. The uplink CAWGs $2_{a1-1}$, $2_{a1-2}$, $2_{a1-3}$, and $2_{a1-4}$ and the downlink CAGWs $2_{a2-1}$, $2_{a2-2}$, $2_{a2-3}$, and $2_{a2-4}$ are connected to the k core switches separately using corresponding core optical multiplexers/demultiplexers in a core optical multiplexer/demultiplexer group $5_a$. Each CAWG corresponds to N core optical multiplexers/demultiplexers. In this embodiment, for the purpose of convenience, eight rectangles are used to represent N core optical multiplexers/demultiplexers corresponding to the eight CAWGs. A small box marked with 1 in four rectangles on the left represents the first one of N core optical multiplexers/demultiplexers corresponding to each uplink CAWG.

In the foregoing connection manner, signals with a same wavelength that are sent through 4 lanes of a port P1 of the edge switch $4_{a1}$ reach the edge optical multiplexers/demultiplexers $3_{a1-1}$, $3_{a1-2}$, $3_{a1-3}$, and $3_{a1-4}$ separately; the edge optical multiplexers/demultiplexers $3_{a1-1}$, $3_{a1-2}$, $3_{a1-3}$, and $3_{a1-4}$ multiplex the signals from the four lanes, and then send four WDM signals that are obtained by means of the multiplexing to the uplink CAWGs $2_{a1-1}$, $2_{a1-2}$, $2_{a1-3}$, and $2_{a1-4}$ separately through the first input ports of the uplink CAWGs $2_{a1-1}$, $2_{a1-2}$, $2_{a1-3}$, and $2_{a1-4}$; the uplink CAWGs $2_{a1-1}$, $2_{a1-2}$, $2_{a1-3}$, and $2_{a1-4}$ perform internal switching on the received optical signals, and then output the optical signals to core optical multiplexers/demultiplexers (that is, four small boxes marked with 1 in $5_a$) corresponding to respective first output ports of the uplink CAWGs $2_{a1-1}$, $2_{a1-2}$, $2_{a1-3}$, and $2_{a1-4}$; each core optical multiplexer/demultiplexer demultiplexes the received WDM signals and sends the four demultiplexed signals to four lanes of a port P1 of a core optical multiplexer/demultiplexer switch $1_a$ separately. Therefore, according to this embodiment of the present invention, signals sent through H lanes of one port of a high-speed switch can reach a same port of a same core switch.

In FIG. 5, the 2*Y CAWGs are divided into two CAWG subgroups, where one CAWG subgroup includes 4 uplink CAWGs and the other CAWG subgroup includes 4 downlink CAWGs. In actual networking, the 2*4 CAWGs may also be divided into 4 CAWG subgroups, where each CAWG subgroup includes one uplink CAWG and one downlink CAWG. Each CAWG of the foregoing 4 CAWG subgroups is connected to the k core switches separately using corresponding N edge optical multiplexers/demultiplexers.

Furthermore, another solution may also be designed for a high-speed switch, to make signals sent through H lanes of one port of an edge switch reach a same port of a same core switch.

Figure 6:
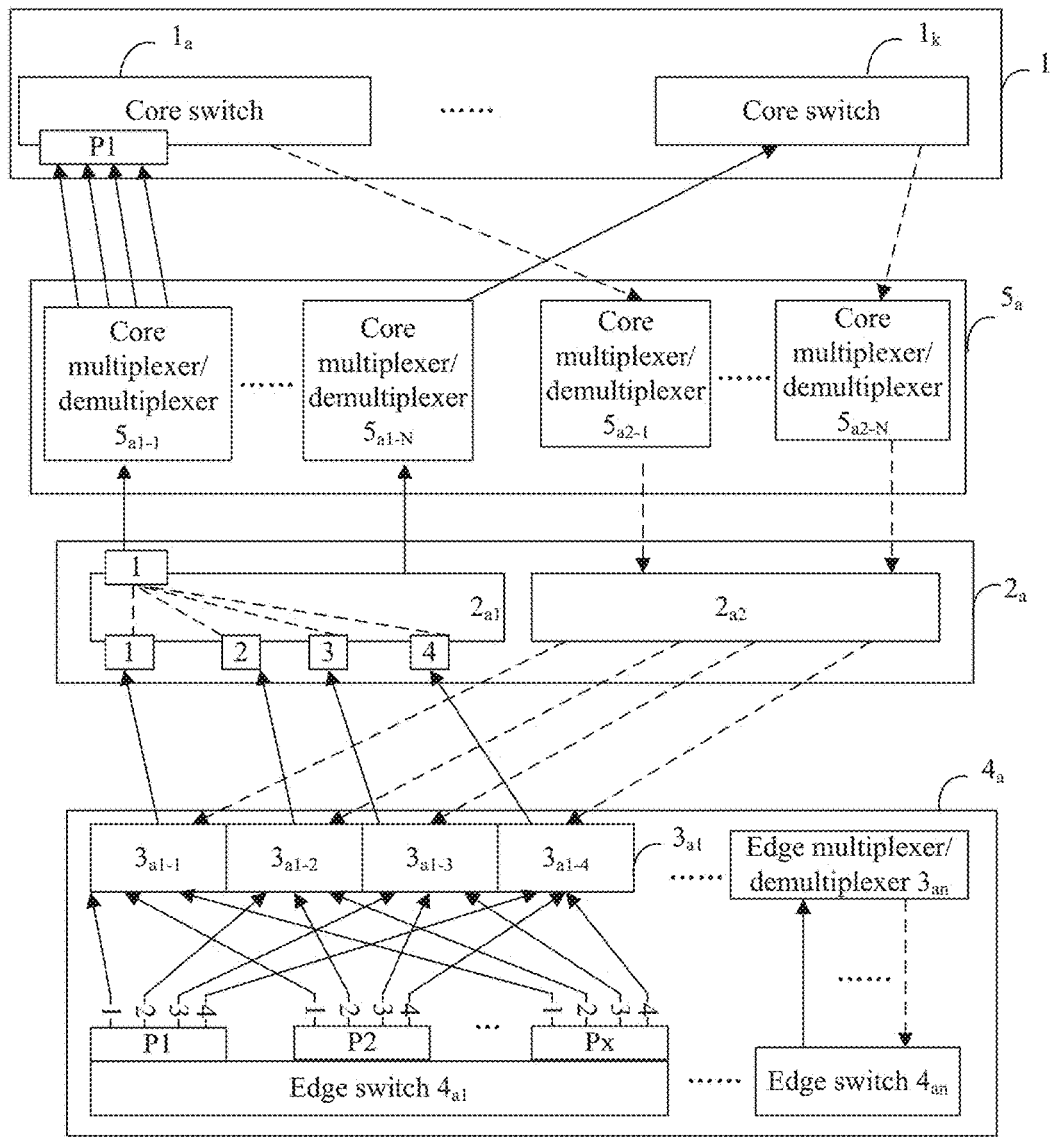
FIG. 6 is a schematic diagram of a connection between an edge switch group $4_a$ and a core switch group 1 when a port of an edge switch is a 40 GE port, according to still another embodiment of the present invention.

For example, by means of design, it may be implemented that signals sent through H lanes of one port of a high-speed switch correspond to different wavelengths, so that the signals sent through the H lanes of one port can be sent to a same uplink CAWG. It is assumed that a first edge switch group is an edge switch group $4_a$. FIG. 6 is another schematic diagram of a connection between the edge switch group $4_a$ and the core switch group 1, where an edge optical multiplexer/demultiplexer group corresponding to each edge switch includes H edge optical multiplexers/demultiplexers (4 edge optical multiplexers/demultiplexers are shown in the figure), and lanes with a same number of x ports of the edge switch correspond to a same edge optical multiplexer/demultiplexer, that is, the H edge optical multiplexers/demultiplexers are separately connected to lanes of same ordinal numbers of each port. For example, in FIG. 6, an edge optical multiplexer/demultiplexer $3_{a1-1}$ is connected to the first lane of each port of an edge switch $4_{a1}$; an edge optical multiplexer/demultiplexer $3_{a1-2}$ is connected to the second lane of each port of the edge switch $4_{a1}$; an edge optical multiplexer/demultiplexer $3_{a1-3}$ is connected to the third lane of each port of the edge switch $4_{a1}$; an edge optical multiplexer/demultiplexer $3_{a1-4}$ is connected to the fourth lane of each port of the edge switch $4_{a1}$. Four signals sent through four lanes of each port have four different wavelengths, and the four signals may be sent to a same CAWG. Therefore, in this embodiment, it is only required that each CAWG group should include one uplink CAWG and one downlink CAWG, that is, Y=1, a CAWG group $2_a$ corresponding to the edge switch group $4_a$ include 2*Y=2*1=2 CAWGs, and the edge optical multiplexers/demultiplexers $3_{a1-1}$, $3_{a1-2}$, $3_{a1-3}$, and $3_{a1-4}$ are connected to different ports of an uplink CAWG$2_{a1}$ and a downlink CAGW$2_{a2}$ separately. A core optical multiplexer/demultiplexer group $5_a$ corresponding to the CAWG group $2_a$ includes core optical multiplexers/demultiplexers $5_{a1-1}$ to $5_{a1-N}$ corresponding to the uplink CAWG$2_{a1}$ and core optical multiplexers/demultiplexers $5_{a2-1}$ to $5_{a2-N}$ corresponding to the downlink CAWG$2_{a2}$. The uplink CAWG$2_{a1}$ and the downlink CAGW$2_{a2}$ are connected to the k core switches separately using corresponding N core optical multiplexers/demultiplexers. In the foregoing connection manner, signals that have different wavelengths and are sent through four lanes of a port P1 of the edge switch $4_{a1}$ reach the edge optical multiplexers/demultiplexers $3_{a1-1}$, $3_{a1-2}$, $3_{a1-3}$, and $3_{a1-4}$ separately; the edge optical multiplexers/demultiplexers $3_{a1-1}$, $3_{a1-2}$, $3_{a1-3}$, and $3_{a1-4}$ multiplex the signals from the four lanes separately, and send four WDM signals that are obtained by means of the multiplexing to corresponding input ports of the uplink CAWG$2_{a1}$ separately; the uplink CAWG$2_{a1}$ performs internal switching on the four received optical signals, and then sends all the optical signals to the core optical multiplexer/demultiplexer $5_{a1\text{-}1}$ corresponding to an output port 1; the core optical multiplexer/demultiplexer $5_{a1\text{-}1}$ demultiplexes the received WDM signals and sends the four demultiplexed signals to four lanes of a port P1 of a core switch $1_a$. According to this embodiment of the present invention, signals sent through H lanes of one port of a high-speed switch can also reach a same port of a same core switch.

Similar to FIG. 6, when signals sent through H lanes of one port of a high-speed switch correspond to different wavelengths, other different processing manners may also be designed for the signals sent through one port, and correspondingly, different networking manners may also be designed for a data center network.

Figure 7:
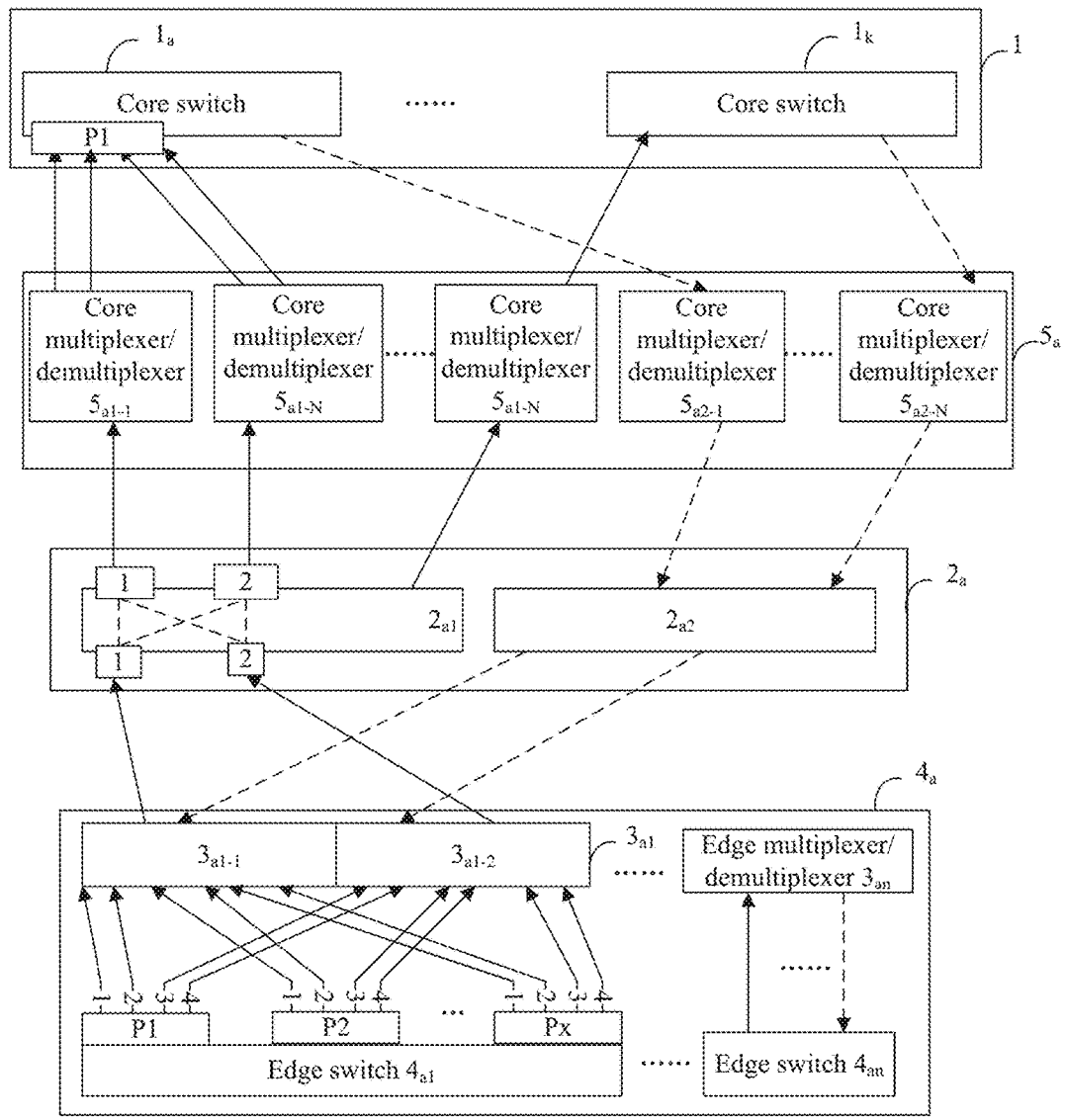
FIG. 7 is a schematic diagram of a connection between an edge switch group $4_a$ and a core switch group 1 when a port of an edge switch is a 40 GE port, according to yet another embodiment of the present invention.

For example, in FIG. 7, an edge optical multiplexer/demultiplexer group corresponding to each edge switch in an edge optical multiplexer/demultiplexer switch group $4_a$ includes two edge optical multiplexers/demultiplexers. For example, an edge switch $4_{a1}$ corresponds to core optical multiplexers/demultiplexers $3_{a1\text{-}1}$ and $3_{a1\text{-}2}$, where the one edge optical multiplexer/demultiplexer $3_{a1\text{-}1}$ is connected to the first and the second lanes (which may be described as L lanes) of each port of the edge switch $4_{a1}$ and the other edge optical multiplexer/demultiplexer $3_{a1\text{-}2}$ is connected to other lanes (which may be described as H-L lanes) of each port of the edge switch $4_{a1}$. The edge optical multiplexer/demultiplexer $3_{a1\text{-}1}$ is configured to receive and multiplex signals sent through the L lanes of each port of the edge switch $4_{a1}$, and send WDM signals obtained by means of the multiplexing to an input port 1 of an uplink $CAWG2_{a1}$; the edge optical multiplexer/demultiplexer $3_{a1\text{-}2}$ is configured to receive and multiplex signals sent through the other H-L lanes of each port of the edge switch $4_{a1}$, and send WDM signals obtained by means of the multiplexing to an input port 2 of the uplink $CAWG2_{a1}$; the uplink $CAWG2_{a1}$ performs internal switching on the WDM signals received from the input ports 1 and 2, sends some of the WDM signals to an output port 1, and sends some of the WDM signals to an output port 2; two core optical multiplexers/demultiplexers connected to the output port 1 and the output port 2 separately demultiplex the received WDM signals to obtain four demultiplexed signals, and send the four demultiplexed signals to four lanes of a port P1 of a core switch $1_a$.

Figure 8:
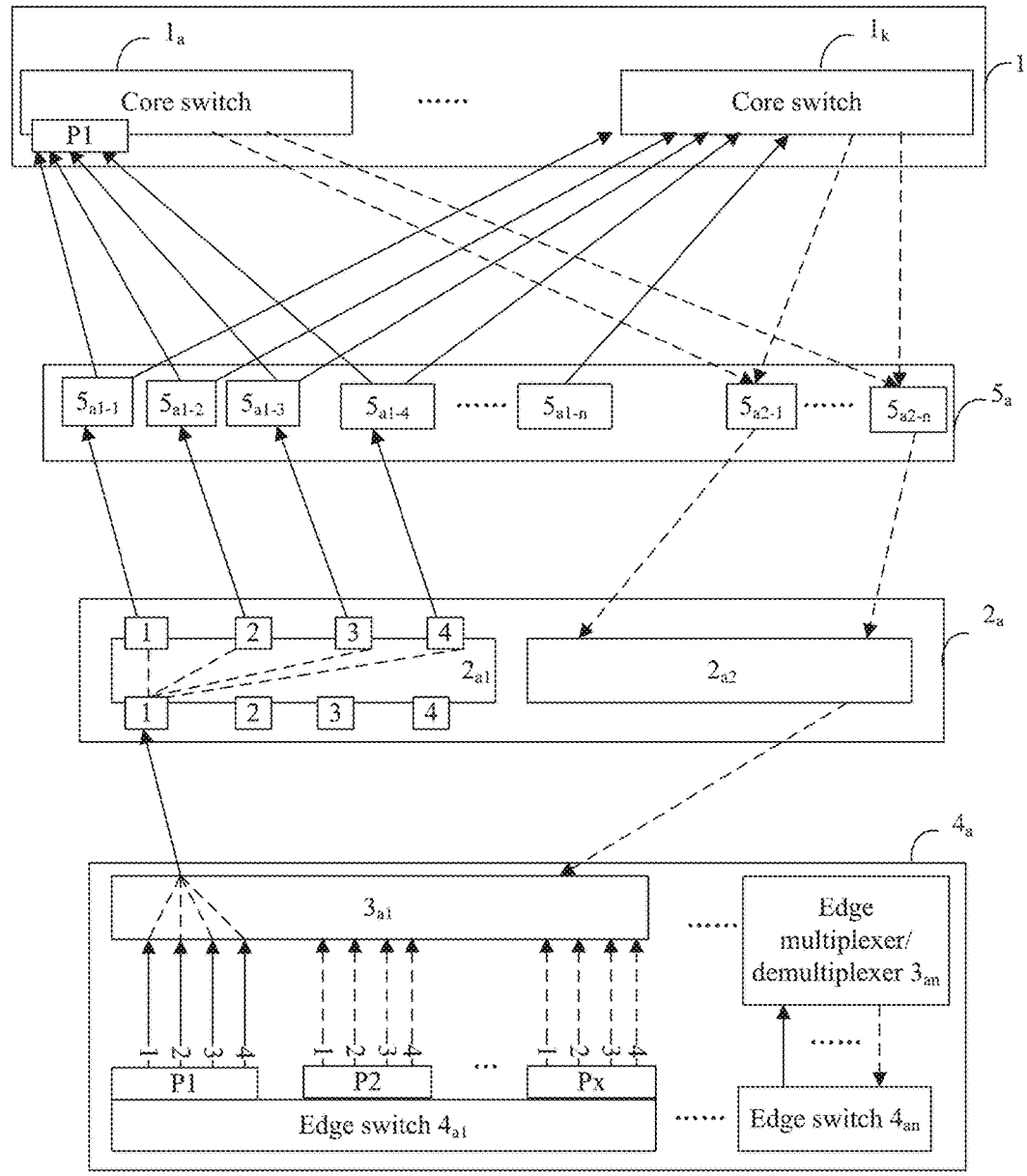
FIG. 8 is a schematic diagram of a connection between an edge switch group $4_a$ and a core switch group 1 when a port of an edge switch is a 40 GE port, according to still yet another embodiment of the present invention.

For another example, in a first edge switch group, if an edge optical multiplexer/demultiplexer group corresponding to each edge switch includes one edge optical multiplexer/demultiplexer, Y=1, and each CAWG group includes one uplink CAWG and one downlink CAWG. As shown in FIG. 8, an edge optical multiplexer/demultiplexer corresponding to an edge switch $4_{a1}$ is $3_{a1}$, and a CAWG group $2_a$ corresponding to an edge switch group $4_a$ includes an uplink $CAWG2_{a1}$ and a downlink $CAWG2_{a2}$. A core optical multiplexer/demultiplexer group corresponding to the CAWG group $2_a$ includes core optical multiplexers/demultiplexers $5_{a1\text{-}1}$ to $5_{a1\text{-}n}$ corresponding to the uplink $CAWG2_{a1}$ and core optical multiplexers/demultiplexers $5_{a2\text{-}1}$ to $5_{a2\text{-}n}$ corresponding to the downlink $CAWG2_{a2}$. The edge optical multiplexer/demultiplexer $3_{a1}$ is connected to all lanes (four lanes are shown in FIG. 8) of each port of the corresponding edge switch. The edge optical multiplexer/demultiplexer $3_{a1}$ is configured to receive and multiplex signals sent through all the lanes of each port of the edge switch, and send WDM signals that are obtained by means of the multiplexing to a port (which is input port 1 in the figure), which is connected to the edge optical multiplexer/demultiplexer $3_{a1}$, of the uplink $CAWG2_{a1}$; the uplink $CAWG2_{a1}$ performs internal switching on the WDM signals received from an input port 1, sends optical signals corresponding to the four lanes to output ports 1 to 4 separately; four core optical multiplexers/demultiplexers connected to the output ports 1 to 4 separately demultiplex the received WDM signals, and send four demultiplexed signals to four lanes of a port P1 of a core switch $1_a$. In the foregoing embodiments of the present invention, schematic diagrams of connections in an uplink direction are mainly illustrated, and a manner of a connection in a downlink direction is similar to the connection manners in FIG. 3 to FIG. 8.

The edge switches in the foregoing embodiments may be top of rack switches (TOR) or end of row switches (EOR).

A signal sent by an edge switch in the foregoing embodiments may be an electrical signal, an optical signal, or a WDM signal. A person skilled in the art knows that, both an optical signal and an electrical signal can be converted into a WDM signal required in the embodiments of the present invention after a conversion. Therefore, in the foregoing embodiments of the present invention, all traffic received or sent by a port of an edge switch or a port of a core switch is called "signal", and a signal transmitted in an edge optical multiplexer/demultiplexer, a CAWG, and a core optical multiplexer/demultiplexer is called a "WDM signal".

If an edge switch in an edge switch group cannot process a WDM signal, the edge switch group further includes one or more optical-to-electrical conversion apparatuses corresponding to each edge switch, which are configured to convert an electrical signal or an optical signal sent by the edge switch connected to the optical-to-electrical conversion apparatus into a WDM signal required in the present invention, and configured to convert a WDM signal sent by an edge optical multiplexer/demultiplexer into a signal that can be processed by the edge switch. Correspondingly, if a core switch cannot process a WDM signal, the data center network further includes k optical-to-electrical conversion apparatuses corresponding to the k core switches, which are configured to convert a WDM signal to be sent to the core switch into a signal that can be processed by the core switch, or convert a signal sent by the core switch into a WDM signal.

In the foregoing embodiments, 2*Y CAWGs in each CAWG group may be logical CAWGs or physical CAWGs; the k core switches may be physical core switches or logical core switches. In the foregoing embodiments, all groups are logical groups. A person skilled in the art may group different physical devices or configure logical groups on a same physical device according to an actual networking requirement.

In the foregoing embodiments, the "connection" may be a direct connection or may be a connection implemented using another device or medium.

Figure 9:
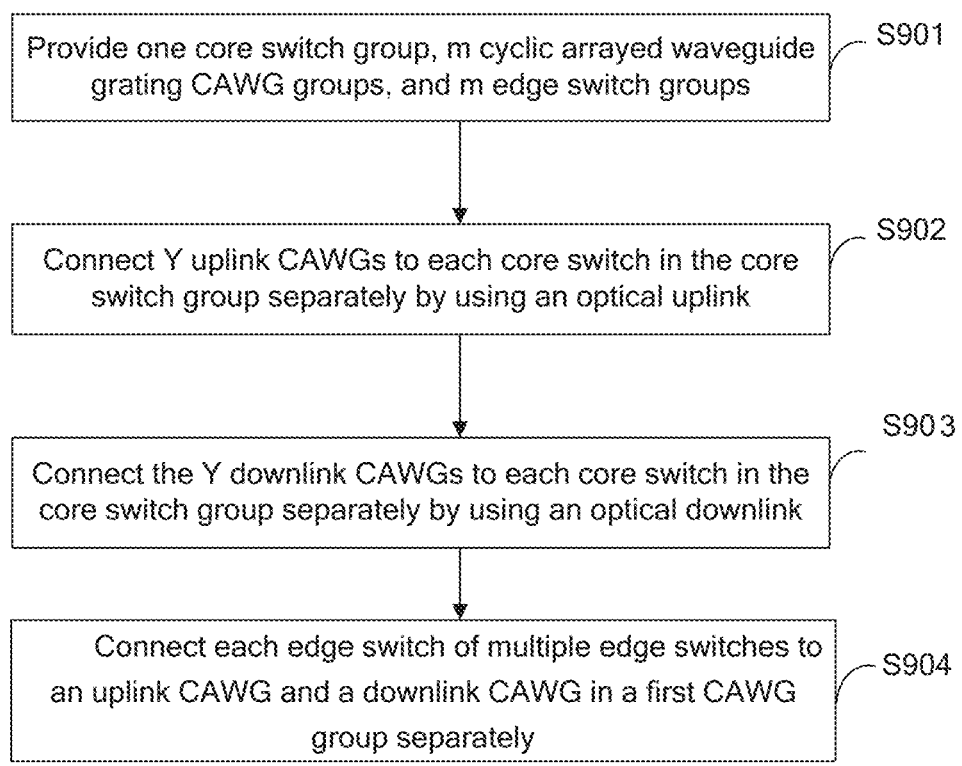
FIG. 9 is a schematic flowchart of a method for deploying a data center network according to an embodiment of the present invention.

An embodiment of the present invention further provides a method for deploying a data center network, which is used to deploy the data center network in FIG. 3 to FIG. 8. As shown in FIG. 9, the method includes the following steps.

S901. Provide one core switch group, m CAWG groups, and m edge switch groups, where the m CAWG groups and the m edge switch groups are in a one-to-one correspondence, the m CAWG groups include a first CAWG group, and the m edge switch groups include a first edge switch group, where the first edge switch group is any one of the m edge switch groups, the first CAWG group is a CAWG group corresponding to the first edge switch group, the first CAWG group includes 2*Y N*N CAWGs, and the 2*Y CAWGs include Y uplink CAWGs and Y downlink CAWGs.

S902. Connect the Y uplink CAWGs to each core switch in the core switch group separately using an optical uplink.

S903. Connect the Y downlink CAWGs to each core switch in the core switch group separately using an optical downlink.

S904. Connect each edge switch of the multiple edge switches to an uplink CAWG and a downlink CAWG in the first CAWG group separately.

Any one of the number of edge switches in the first edge switch group, the number of ports of each edge switch in the first edge switch group, and k is less than or equal to N.

There is no limitation on the sequence of the foregoing steps S902 to S904, which can be arranged randomly.

In an embodiment of the present invention, the first edge switch group further includes multiple edge optical multiplexer/demultiplexer groups separately corresponding to the multiple edge switches in the first edge switch group, and each edge optical multiplexer/demultiplexer group includes at least one edge optical multiplexer/demultiplexer; the step S904 includes connecting each edge switch to the uplink CAWG in the first CAWG group using a corresponding edge optical multiplexer/demultiplexer group and an optical uplink connected to the edge optical multiplexer/demultiplexer group, and connecting each edge switch to the downlink CAWG in the first CAWG group using the edge optical multiplexer/demultiplexer group and an optical downlink connected to the edge optical multiplexer/demultiplexer group.

In another embodiment of the present invention, the data center network further includes m core optical multiplexer/demultiplexer groups, where the m core optical multiplexer/demultiplexer groups and the m CAWG groups are in a one-to-one correspondence, and the m core optical multiplexer/demultiplexer groups include a first core optical multiplexer/demultiplexer group, where the first core optical multiplexer/demultiplexer group is any one of the m core optical multiplexer/demultiplexer groups, the first core optical multiplexer/demultiplexer group corresponds to the first CAWG group, and the first core optical multiplexer/demultiplexer group includes 2*Y*N core optical multiplexers/demultiplexers, where N core optical multiplexers/demultiplexers correspond to one uplink CAWG or one downlink CAWG. The step S902 includes connecting each uplink CAWG of the Y uplink CAWGs to each core switch in the core switch group using N core optical multiplexers/demultiplexers that are connected to each uplink CAWG using optical uplinks; the step S903 includes connecting each downlink CAWG of the Y downlink CAWGs to each core switch in the core switch group using N core optical multiplexers/demultiplexers that are connected to each downlink CAWG using optical downlinks.

Corresponding to FIG. 4, when a port of each edge switch in the first edge switch group is a 10 GE port, the edge optical multiplexer/demultiplexer group corresponding to each edge switch includes one edge optical multiplexer/demultiplexer; Y=1, the first CAWG group includes one uplink CAWG and one downlink CAWG; and the step S904 includes connecting the edge optical multiplexer/demultiplexer corresponding to each edge switch in the first edge switch group to different ports of the uplink CAWG separately using optical uplinks, and connecting the edge optical multiplexer/demultiplexer corresponding to each edge switch in the first edge switch group to different ports of the downlink CAWG separately using optical downlinks.

Corresponding to FIG. 5, when a port of each edge switch in the first edge switch group is an H*10 G port, each port is divided into H lanes, and signals sent through the lanes have a same wavelength; the edge optical multiplexer/demultiplexer group corresponding to each edge switch includes H edge optical multiplexers/demultiplexers; the H edge optical multiplexers/demultiplexers are separately connected to lanes of same ordinal numbers of each port; the first CAWG group includes Y uplink CAWGs and Y downlink CAWGs, where Y=H; and the step S904 includes connecting the H edge optical multiplexers/demultiplexers corresponding to each edge switch to the Y uplink CAWGs separately using optical uplinks, and connecting the H edge optical multiplexers/demultiplexers corresponding to each edge switch to the Y downlink CAWGs separately using optical downlinks.

Corresponding to FIG. 6, when a port of each edge switch in the first edge switch group is an H*10 G port, each port is divided into H lanes, and signals sent through the lanes correspond to different wavelengths; the edge optical multiplexer/demultiplexer group corresponding to each edge switch includes H edge optical multiplexers/demultiplexers; the H edge optical multiplexers/demultiplexers are separately connected to lanes of same ordinal numbers of each port of the corresponding edge switch; the first CAWG group includes one uplink CAWG and one downlink CAWG; and the step S904 includes connecting the H edge optical multiplexers/demultiplexers corresponding to each edge switch to H ports of the uplink CAWG separately using optical uplinks, and connecting H ports corresponding to each edge switch to H ports of the downlink CAWG separately using optical downlinks.

Corresponding to FIG. 7, when a port of each edge switch in the first edge switch group is an H*10 G port, each port is divided into H lanes, and signals sent through the lanes correspond to different wavelengths; the edge optical multiplexer/demultiplexer group corresponding to each edge switch includes two edge optical multiplexers/demultiplexers, where one edge optical multiplexer/demultiplexer is connected to L lanes of each port of the corresponding edge switch, and the other edge optical multiplexer/demultiplexer is connected to the rest H-L lanes of each port of the corresponding edge switch; the first CAWG group includes one uplink CAWG and one downlink CAWG; and the step S904 includes connecting the two edge optical multiplexers/demultiplexers corresponding to each edge switch to two ports of the uplink CAWG separately using optical uplinks, and connecting the two edge optical multiplexers/demultiplexers corresponding to each edge switch to two ports of the downlink CAWG separately using optical downlinks.

Corresponding to FIG. 8, when a port of each edge switch in the first edge switch group is an H*10 G port, each port is divided into H lanes, and signals sent through the lanes correspond to different wavelengths; the edge optical multiplexer/demultiplexer group corresponding to each edge switch includes one edge optical multiplexer/demultiplexer, and the edge optical multiplexer/demultiplexer is connected to all the H lanes of each port of the corresponding edge switch; the first CAWG group includes one uplink CAWG and one downlink CAWG; and the step S904 includes connecting the edge optical multiplexer/demultiplexer corresponding to each edge switch to one port of the uplink CAWG using an optical uplink, and connecting the edge optical multiplexer/demultiplexer corresponding to each edge switch to one port of the downlink CAWG using an optical downlink.

If a signal sent by an edge switch in the first edge switch group is an electrical signal or an optical signal, the method further includes providing, for each edge switch group, multiple optical-to-electrical conversion apparatuses corresponding to multiple edge switches in the edge switch group, and connecting each edge switch to a corresponding optical-to-electrical conversion apparatus.

Correspondingly, if a core switch cannot process a WDM signal, the method further includes providing k optical-to-electrical conversion apparatuses corresponding to the k core switches, and connecting each core switch to an optical-to-electrical conversion apparatus corresponding to the core switch.

Figure 1:
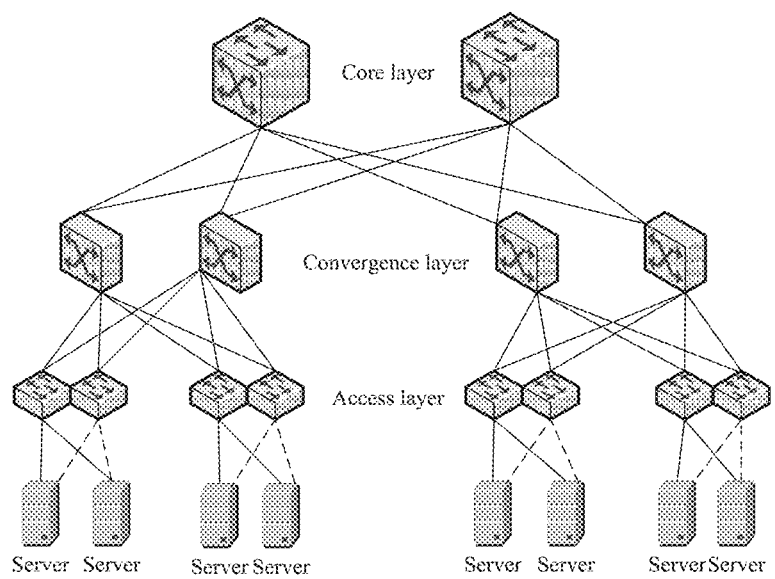
FIG. 1 is a schematic structural diagram of a data center network in the prior art.

Based on the foregoing embodiments of the present invention, it is assumed that a data center network including 192 edge switches needs to be formed, and each switch supporting thirty-two 10 GE ports. In order to implement interworking between any two edge switches of the 192 edge switches, the 192 edge switches are preferably divided into six edge switch groups, where each edge switch group includes 32 edge switches; corresponding to the six edge switch groups, twelve 32*32 CAWGs are required, and the 12 CAWGs are connected to 32 core switches separately. In the foregoing connection manner, 32*2*6=384 pairs of optical fibers are required. If the networking manner shown in FIG. 1 is adopted, each port of an access switch needs to be connected to a convergence switch using one pair of optical fibers, and each port of a convergence switch needs to be connected to a core switch using one pair of optical fibers. Then, to achieve a same networking scale, the number of optical fibers connected to each switch will reach 32*(A-1)*32*6 pairs, which is a huge number, where A is the number of layers of the network. In a scenario of the three-layer network shown in FIG. 1, the number of optical fibers connected to each switch is 32*2*32*6=12288 pairs.

It can be known that, with a data center networking solution of the present invention, the number of optical fibers required for networking can be substantially reduced, thereby reducing cabling costs. In addition, because the number of optical fibers required is substantially reduced, a bottleneck of cabling in an equipment room is solved, and physical deployment of devices is simplified. Furthermore, because a CAWG is used as an intermediate device for connecting an edge switch and a core switch, port capacity expansion on a switch can be implemented simply by connecting a pigtail to an edge multiplexer/de-multiplexer, without a need to deploy pipeline fibers across equipment rooms, which makes network capacity expansion and maintenance convenient.

In the data center network according to the embodiments of the present invention, a conventional three-layer network structure is simplified to be two-layer physical networking, which simplifies the network structure and reduces network layers. Because connections at one network layer are reduced, a device switching capacity and the number of ports required for an entire network is reduced by ½, that is, costs of devices and ports are reduced by half. Furthermore, because a CAWG can be connected to a larger number of core switches and load sharing is implemented between core switches, a capability bottleneck of core switches can be resolved, and a large-scale data center network can be constructed.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

The invention claimed is:

1. A data center network, comprising:
   one core switch group;
   m cyclic arrayed waveguide gating (CAWG) groups; and
   m edge switch groups,
   wherein the m CAWG groups and the m edge switch groups are in a one-to-one correspondence,
   wherein the m CAWG groups comprise a first CAWG group,
   wherein the m edge switch groups comprise a first edge switch group,
   wherein the first edge switch group is one of the m edge switch groups,
   wherein the first CAWG group is a CAWG group corresponding to the first edge switch group,
   wherein the core switch group comprises k core switches,
   wherein the first CAWG group comprises 2*Y N*N CAWGs,
   wherein the 2*Y CAWGs comprise Y uplink CAWGs and Y downlink CAWGs,
   wherein the Y uplink CAWGs are connected to each core switch in the core switch group separately using an optical uplink,
   wherein the Y downlink CAWGs are connected to each core switch in the core switch group separately using an optical downlink, and
   wherein the first edge switch group comprises multiple edge switches,
   wherein each edge switch of the multiple edge switches is connected to an uplink CAWG and a downlink CAWG in the first CAWG group separately,
   wherein at least one of the number of edge switches in the first edge switch group, a number of ports of each edge switch in the first edge switch group, or k are less than or equal to N,
   wherein the first edge switch group further comprises multiple edge optical multiplexer demultiplexer groups separately corresponding to the multiple edge switches in the first edge switch group,
   wherein each edge optical multiplexer/demultiplexer group comprises at least one edge optical multiplexer or demultiplexer, and
   wherein each edge switch of the multiple edge switches being connected to the uplink CAWG and the downlink CAWG in the first CAWG group separately comprises each edge switch being connected to the uplink CAWG in the first CAWG group using a corresponding edge optical multiplexer/demultiplexer group and the optical uplink connected to the edge optical multiplexer/demultiplexer group and each edge switch being connected to the downlink CAWG in the first CAWG group using the edge optical multiplexer/demultiplexer group and the optical downlink connected to the edge optical multiplexer/demultiplexer group.

2. The data center network according to claim 1, wherein the data center network further comprises m core optical multiplexer/demultiplexer groups, wherein the m core optical multiplexer/demultiplexer groups and the m CAWG groups are in a one-to-one correspondence, wherein the m core optical multiplexer/demultiplexer groups comprise a first core optical multiplexer/demultiplexer group, wherein the first core optical multiplexer/demultiplexer group is one of the m core optical multiplexer/demultiplexer groups, wherein the first core optical multiplexer/demultiplexer group corresponds to the first CAWG group, wherein the first core optical multiplexer/demultiplexer group comprises 2*Y*N core optical multiplexers/demultiplexers, wherein N core optical multiplexers/demultiplexers correspond to one uplink CAWG or one downlink CAWG, wherein the Y uplink CAWGs being connected to each core switch in the core switch group separately using the optical uplink comprises each uplink CAWG of the Y uplink CAWGs being connected to each core switch in the core switch group using N core optical multiplexers/demultiplexers that are connected to each uplink CAWG using optical uplinks, and wherein the Y downlink CAWGs being connected to each core switch in the core switch group separately using the optical downlink comprises each downlink CAWG being connected to each core switch in the core switch group using N core optical multiplexers/demultiplexers that are connected to each downlink CAWG using optical downlinks.

3. The data center network according to claim 2, wherein a port of each edge switch in the first edge switch group is a 10GE port, wherein the edge optical multiplexer/demultiplexer group corresponding to each edge switch comprises one edge optical multiplexer/demultiplexer, wherein Y equals 1, wherein the first CAWG group comprises one uplink CAWG and one downlink CAWG, wherein the edge optical multiplexer/demultiplexer corresponding to each edge switch in the first edge switch group is connected to different ports of the uplink CAWG separately using optical uplinks, and wherein the edge optical multiplexer/demultiplexer corresponding to each edge switch in the first edge switch group is connected to different ports of the downlink CAWG separately using optical downlinks.

4. The data center network according to claim 2, wherein a port of each edge switch in the first edge switch group is an H*10G port, wherein each port is divided into H lanes, wherein signals sent through the lanes have a same wavelength, wherein the edge optical multiplexer/demultiplexer group corresponding to each edge switch comprises H edge optical multiplexers/demultiplexers, wherein the H edge optical multiplexers/demultiplexers are separately connected to lanes of same ordinal numbers of each port, wherein the first CAWG group comprises the uplink CAWGs and the Y downlink CAWGs, wherein Y equals H, wherein the H edge optical multiplexers/demultiplexers corresponding to each edge switch are connected to the Y uplink CAWGs separately using optical uplinks, and wherein the H edge optical multiplexers/demultiplexers corresponding to each edge switch are connected to the Y downlink CAWGs separately using optical downlinks.

5. The data center network according to claim 2, wherein a port of each edge switch in the first edge switch group is an H*10G port, wherein each port is divided into H lanes, wherein signals sent through the lanes correspond to different wavelengths, wherein the edge optical multiplexer/demultiplexer group corresponding to each edge switch comprises H edge optical multiplexers/demultiplexers, wherein the H edge optical multiplexers/demultiplexers are separately connected to lanes of same ordinal numbers of each port of the corresponding edge switch, wherein the first CAWG group comprises one uplink CAWG and one downlink CAWG, wherein the H edge optical multiplexers/demultiplexers corresponding to each edge switch are connected to H ports of the uplink CAWG separately using optical uplinks, and wherein the H ports corresponding to each edge switch are connected to H ports of the downlink CAWG separately using optical downlinks.

6. The data center network according to claim 2, wherein a port of each edge switch in the first edge switch group is an H*10G port, wherein each port is divided into H lanes, wherein signals sent through the lanes correspond to different wavelengths, wherein the edge optical multiplexer/demultiplexer group corresponding to each edge switch comprises two edge optical multiplexers/demultiplexers, wherein one edge optical multiplexer/demultiplexer is connected to L lanes of each port of the corresponding edge switch, wherein the other edge optical multiplexer/demultiplexer is connected to the rest H-L lanes of each port of the corresponding edge switch, wherein the first CAWG group comprises one uplink CAWG and one downlink CAWG, wherein the two edge optical multiplexers/demultiplexers corresponding to each edge switch are connected to two ports of the uplink CAWG separately using optical uplinks, and wherein the two edge optical multiplexers/demultiplexers corresponding to each edge switch are connected to two ports of the downlink CAWG separately using optical downlinks.

7. The data center network according to claim 2, wherein a port of each edge switch in the first edge switch group is an H*10G port, wherein each port is divided into H lanes, and wherein signals sent through the lanes correspond to different wavelengths, wherein the edge optical multiplexer/demultiplexer group corresponding to each edge switch comprises one edge optical multiplexer/demultiplexer, wherein the edge optical multiplexer/demultiplexer is connected to all the H lanes of each port of the corresponding edge switch, wherein the first CAWG group comprises one uplink CAWG and one downlink CAWG, wherein the edge optical multiplexer/demultiplexer corresponding to each edge switch is connected to one port of the uplink CAWG using an optical uplink, and wherein the edge optical multiplexer/demultiplexer corresponding to each edge switch is connected to one port of the downlink CAWG using an optical downlink.

8. The data center network according to claim 1, wherein a port of each edge switch in the first edge switch group is a 10GE port, wherein the edge optical multiplexer/demultiplexer group corresponding to each edge switch comprises one edge optical multiplexer/demultiplexer, wherein Y equals 1, wherein the first CAWG group comprises one uplink CAWG and one downlink CAWG, wherein the edge optical multiplexer/demultiplexer corresponding to each edge switch in the first edge switch group is connected to different ports of the uplink CAWG separately using optical uplinks, and wherein the edge optical multiplexer/demultiplexer corresponding to each edge switch in the first edge switch group is connected to different ports of the downlink CAWG separately using optical downlinks.

9. The data center network according to claim 1, wherein a port of each edge switch in the first edge switch group is an H*10G port, wherein each port is divided into H lanes, wherein signals sent through the lanes have a same wavelength, wherein the edge optical multiplexer/demultiplexer group corresponding to each edge switch comprises H edge optical multiplexers/demultiplexers, wherein the H edge optical multiplexers/demultiplexers are separately connected to lanes of same ordinal numbers of each port, wherein the first CAWG group comprises the Y uplink CAWGs and the Y downlink CAWGs, wherein Y equals H, wherein the H edge optical multiplexers demultiplexers corresponding to each edge switch are connected to the Y uplink CAWGs separately using optical uplinks, and wherein the H edge optical multiplexers/demultiplexers corresponding to each edge switch are connected to the Y downlink CAWGs separately using optical downlinks.

10. The data center network according to claim 1, wherein a port of each edge switch in the first edge switch group is an H*10G port, wherein each port is divided into H lanes, wherein signals sent through the lanes correspond to different wavelengths, wherein the edge optical multiplexer/demultiplexer group corresponding to each edge switch comprises H edge optical multiplexer/demultiplexers, wherein the H edge optical multiplexer/demultiplexers are separately connected to lanes of same ordinal numbers of each port of the corresponding edge switch, wherein the first CAWG group comprises one uplink CAWG and one downlink CAWG, wherein the H edge optical multiplexers/demultiplexers corresponding to each edge switch are connected to H ports of the uplink CAWG separately using optical uplinks, and wherein the H ports corresponding to each edge switch are connected to H ports of the downlink CAWG separately using optical downlinks.

11. The data center network according to claim 1, wherein a port of each edge switch in the first edge switch group is an H*10G port, wherein each port is divided into H lanes, wherein signals sent through the lanes correspond to different wavelengths, wherein the edge optical multiplexer/demultiplexer group corresponding to each edge switch comprises two edge optical multiplexers/demultiplexers, wherein one edge optical multiplexer/demultiplexer is connected to L lanes of each port of the corresponding edge switch, wherein the other edge optical multiplexer/demultiplexer is connected to the rest lanes of each port of the corresponding edge switch, wherein the first CAWG group comprises one uplink CAWG and one downlink CAWG, wherein the two edge optical multiplexers/demultiplexers corresponding to each edge switch are connected to two ports of the uplink CAWG separately using optical uplinks, and wherein the two edge optical multiplexers/demultiplexers corresponding to each edge switch are connected to two ports of the downlink CAWG separately using optical downlinks.

12. The data center network according to claim 1, wherein a port of each edge switch in the first edge switch group is an H*10G port, wherein each port is divided into H lanes, and wherein signals sent through the lanes correspond to different wavelengths, wherein the edge optical multiplexer/demultiplexer group corresponding to each edge switch comprises one edge optical multiplexer/demultiplexer, wherein the edge optical multiplexer/demultiplexer is connected to all the H lanes of each port of the corresponding edge switch, wherein the first CAWS group comprises one uplink CAWG and one downlink CAWG, wherein the edge optical multiplexer/demultiplexer corresponding to each edge switch is connected to one port of the uplink CAWG using an optical uplink, and wherein the edge optical multiplexer/demultiplexer corresponding to each edge switch is connected to one port of the downlink CAWS by using an optical downlink.

* * * * *

UNITED STATES PATENT AND TRADEMARK OFFICE
CERTIFICATE OF CORRECTION

PATENT NO.        : 9,648,401 B2
APPLICATION NO.   : 14/694776
DATED             : May 9, 2017
INVENTOR(S)       : Qinghua Yan It is certified that error appears in the above-identified patent and that said Letters Patent is hereby corrected as shown below:

In the Claims

Column 16, Line 59, Claim 2 should read:

The data center network according to claim 1, wherein the data center network further comprises m core optical multiplexer/demultiplexer groups, wherein the m core optical multiplexer/demultiplexer groups and the m CAWG groups are in a one-to-one correspondence, wherein the m core optical multiplexer/demultiplexer groups comprise a first core optical multiplexer/demultiplexer group, wherein the first core optical multiplexer/demultiplexer group is one of the m core optical multiplexer/demultiplexer groups, wherein the first core optical multiplexer/demultiplexer group corresponds to the first CAWG group, wherein the first core optical multiplexer/demultiplexer group comprises 2*Y*N core optical multiplexers/demultiplexers, wherein N core optical multiplexers/demultiplexers correspond to one uplink CAWG or one downlink CAWG, wherein the Y uplink CAWGs being connected to each core switch in the core switch group separately using the optical uplink comprises each uplink CAWG of the Y uplink CAWGs being connected to each core switch in the core switch group using N core optical multiplexers/demultiplexers that are connected to each uplink CAWG using optical uplinks, and wherein the Y downlink CAWGs being connected to each core switch in the core switch group separately using the optical downlink comprises each downlink CAWG being connected to each core switch in the core switch group using N core optical multiplexers/demultiplexers that are connected to each downlink CAWG using optical downlinks.

Column 17, Line 38, Claim 4 should read:

The data center network according to claim 2, wherein a port of each edge switch in the first edge switch group is an H*10G port, wherein each port is divided into H lanes, wherein signals sent through the lanes have a same wavelength, wherein the edge optical multiplexer/demultiplexer group corresponding to each edge switch comprises H edge optical multiplexers/demultiplexers, wherein the H edge optical multiplexers/demultiplexers are separately connected to lanes of same ordinal numbers Signed and Sealed this
Eleventh Day of July, 2017

Joseph Matal
*Performing the Functions and Duties of the
Under Secretary of Commerce for Intellectual Property and
Director of the United States Patent and Trademark Office* of each port, wherein the first CAWG group comprises, the Y uplink CAWGs and the Y downlink CAWGs, wherein Y equals H, wherein the H edge optical multiplexers/demultiplexers corresponding to each edge switch are connected to the Y uplink CAWGs separately using optical uplinks, and wherein the H edge optical multiplexers/demultiplexers corresponding to each edge switch are connected to the Y downlink CAWGs separately using optical downlinks.

Column 19, line 24, Claim 11 should read:

The date center network according to claim 1, wherein a port of each edge switch in the first edge switch group is an H*10G port, wherein each port is divided into H lanes, wherein signals sent through the lanes correspond to different wavelengths, wherein the edge optical multiplexer/demultiplexer group corresponding to each edge switch comprises two edge optical multiplexers/demultiplexers, wherein one edge optical multiplexer/demultiplexer is connected to L lanes of each port of the corresponding edge switch, wherein the other edge optical multiplexer/demultiplexer is connected to the rest H–L lanes of each port of the corresponding edge switch, wherein the first CAWG group comprises one uplink CAWG and one downlink CAWG, wherein the two edge optical multiplexers/demultiplexers corresponding to each edge switch are connected to two ports of the uplink CAWG separately using optical uplinks, and wherein the two edge optical multiplexers/demultiplexers corresponding to each edge switch are connected to two ports of the downlink CAWG separately using optical downlinks.